United States Patent [19]

Frey

[11] 4,067,534
[45] Jan. 10, 1978

[54] PIPE COUPLER ASSEMBLY

[75] Inventor: William J. Frey, Louisville, Ky.

[73] Assignee: Celanese Corporation, New York, N.Y.

[21] Appl. No.: 724,899

[22] Filed: Sept. 20, 1976

[51] Int. Cl.$^2$ .............................................. F16L 47/00
[52] U.S. Cl. ..................... 285/319; 285/291; 285/369; 285/423; 285/DIG. 16; 285/DIG. 22
[58] Field of Search .............. 285/DIG. 22, DIG. 16, 285/319, 423, 291, 340, 317, 369

[56] References Cited

U.S. PATENT DOCUMENTS

| 921,691 | 5/1909 | Friday | 285/319 X |
| 1,106,761 | 8/1914 | Weikert et al. | 285/DIG. 22 X |
| 2,933,428 | 4/1960 | Mueller | 285/DIG. 16 X |
| 3,245,703 | 4/1966 | Manly | 285/319 |
| 3,666,297 | 5/1972 | Marks | 285/DIG. 22 X |
| 3,784,235 | 1/1974 | Kessler et al. | 285/DIG. 22 X |
| 3,809,412 | 5/1974 | Glover | 285/DIG. 22 X |

FOREIGN PATENT DOCUMENTS

| 2,116,137 | 12/1971 | Germany | 285/291 |

Primary Examiner—Thomas F. Callaghan

[57] ABSTRACT

A pipe coupler assembly comprises a fitting which is securable to the ends of a pair of pipes. The fitting comprises a socket portion for receiving the pipe end. A plurality of tabs project rearwardly and outwardly from the socket portion and are disposed in circumferentially spaced relationship about a longitudinal axis of the fitting. The fitting also includes a circumferentially extending, radially outwardly open channel disposed forwardly of the socket portion. The channel extends radially inwardly relative to the socket portion and is adapted to receive a resilient seal ring. A generally radially extending shoulder is disposed between the tabs and the channel. This shoulder is adapted to engage an edge of the pipe end to limit insertion of the fitting. The assembly also includes a generally cylindrical, open-ended sleeve. The sleeve is sized to receive the fittings through axially aligned chambers thereof. The fittings are insertable into the chambers, with the tabs being initially inwardly flexed and then springing into securing engagement with recesses in the chambers, and with a seal ring in the channel being compressed sealingly against the chamber walls.

9 Claims, 5 Drawing Figures

U.S. Patent   Jan. 10, 1978   Sheet 1 of 2   4,067,534
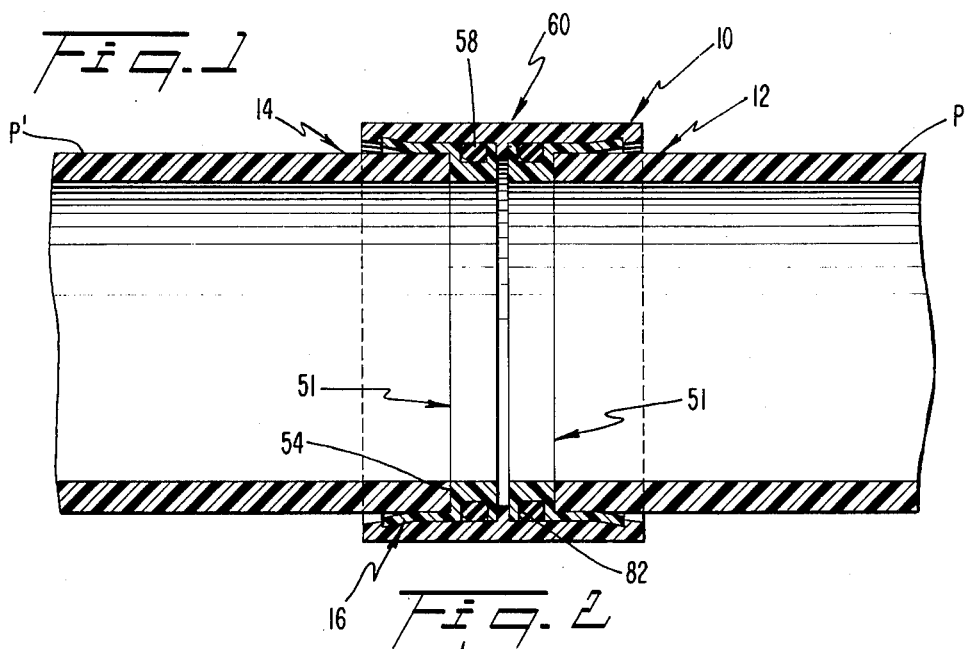
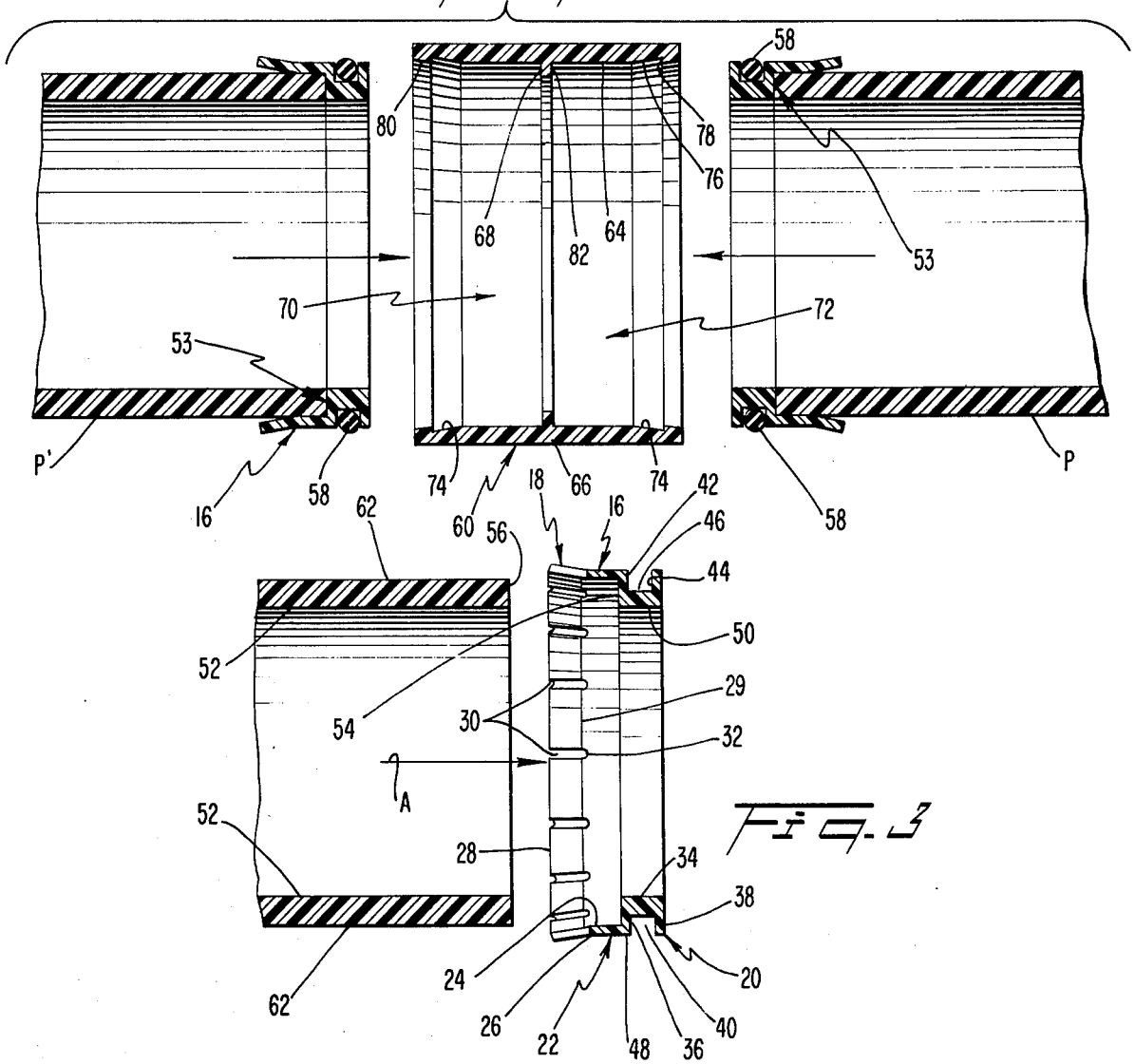

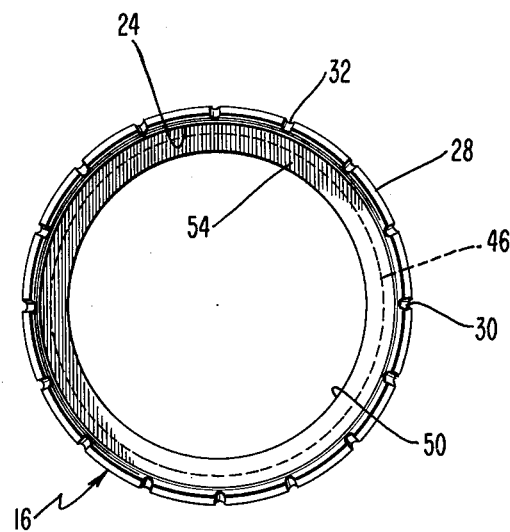
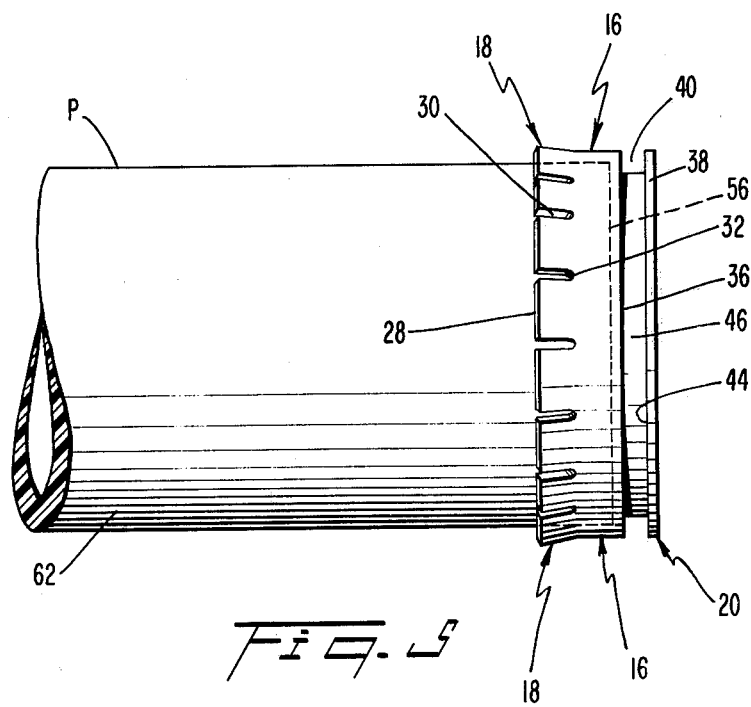

PIPE COUPLER ASSEMBLY

BACKGROUND AND OBJECTS

This invention relates to pipe couplings and, more particularly, to pipe couplings of the quick-connect type for thermoplastic pipe wherein connection is effected automatically by axial movement of a pipe connector end into a chamber.

In establishing flow lines, it is often necessary to couple together the ends of a pair of pipe sections on location. Mechanical couplings which employ bolts or clamps are cumbersome and time-consuming to operate and may require the use of special tools. Couplings have been proposed in which connection is automatically effected by axially merging the connector ends together as demonstrated, for example, in U.S. Pat. Nos. 921,691, issued to Friday on May 18, 1909; 2,452,219, issued to Bergvall et al on Oct. 26, 1948; and 3,809,412, issued to Glover on May 7, 1974. As these patents demonstrate, the couplings can involve insertion of one connector end into a socket of the other connector end, or inserting both connector ends into a separate sleeve. Connection is automatically and quickly effected by the entry of a projection in one part within a recess of another part to prevent separation of the connector ends. While couplings of this nature enable connections to be made rapidly, it is often necessary that the connection be highly secure and leak-proof. Accomplishing this without diminishing the ease and rapidity of the connecting operation can present numerous difficulties, especially with regard to flow lines which are to conduct fluids under substantial pressure.

It can also be prohibitively expensive to form the ends of flow lines of the intricate shape required of many quick-connect couplings.

An easily manipulable coupling arrangement of the quick-connect type which provides a secure, leak-proof connection would be ideally suited in instances where flow lines are established in the field and are situated where subsequent access is inconvenient. Plastic drainage pipelines which are to be buried constitute one special area of utility for such couplings.

It is, therefore, an object of the present invention to obviate or minimize problems of the type discussed above.

It is another object of the present invention to provide a novel pipe coupling.

It is a further object of the present invention to provide a novel quick-connect coupling assembly which provides a secure and leak-proof connection.

It is yet another object of the present invention to provide a novel and inexpensive quick-connect coupling which is easily adapted to conventional pipe sections, particularly those of the thermoplastic variety.

BRIEF SUMMARY

These and other objects are accomplished by the present invention which includes a fitting which is securable to an end of a pipe. The fitting comprises a plurality of rearwardly and outwardly projecting tabs that are disposed in circumferentially spaced relationship about a longitudinal axis of the fitting. The fitting also includes a circumferentially extending, radially outwardly open channel disposed forwardly of the tabs. The channel extends radially inwardly relative to the tabs and is adapted to receive a resilient seal ring. A generally radially extending shoulder is disposed between the tabs and the channel. This shoulder is adapted to engage an edge of the pipe end to limit insertion of the fitting. The fitting may be inserted into a chamber, with the tabs being initially inwardly flexed and then springing into securing engagement with a recess in the chamber, and with a seal ring in the channel being compressed sealingly against the chamber wall.

The chamber may be formed within a generally cylindrical, open-ended sleeve. The sleeve is sized to receive a pair of fittings through axially aligned chambers thereof. The sleeve may be provided with a partition wall projecting slightly inwardly from an inward surface of the sleeve at a location generally midway between the axial length of the sleeve. When the fittings are inserted into the sleeve, they are locked in place to position the respective pipe ends in axially aligned, flow conducting relationship.

THE DRAWINGS

A preferred embodiment of the invention is described subsequently in detail in connection with the accompanying drawings in which like numerals indicate like parts and in which:

FIG. 1 is a longitudinal sectional view through a flow line depicting a pipe coupling assembly according to the invention in a coupled condition;

FIG. 2 is a view similar to FIG. 1 depicting the coupling assembly in an uncoupled condition;

FIG. 3 is a longitudinal sectional view through a pipe connector end and a fitting according to the present invention, with the fitting being separated from the connector end;

FIG. 4 is an end view of a fitting according to the invention, with the fitting being viewed from left to right considered from its FIG. 3 position; and FIG. 5 is a side view of a pipe connector end and a fitting joined thereto.

DETAILED DESCRIPTION

A preferred form of coupling assembly 10 according to the invention is suitable for securing together the free ends, or connector ends 12, 14 of a pair of pipe sections P, P'. The pipe sections may be of any suitable material, such as polyvinylchloride, for example. The coupling assembly 10 includes a fitting 16 which is to be fixedly joined to each pipe end. Each fitting 16 is preferably formed in one piece of a stiff plastic material, such as polypropylene for example.

The fitting 16 includes an annular locking portion 18, an annular sealing portion 20 and an intermediately disposed, generally cylindrical socket portion 22. (See FIG. 3). The socket portion includes inner and outer cylindrical surfaces 24, 26 defining a central longitudinal axis A of the fitting. The inner surface 24 closely approximates the outer diameter of the associated connector end 12 or 14.

The locking portion 18 of the fitting 16 is of generally frustoconical configuration and comprises a series of circumferentially spaced tabs 28. Each tab 28 merges with the cylindrical socket portion 22 along a circumferential line 29 and extends rearwardly outwardly therefrom at a slight angle relative to the longitudinal axis of the fitting. Preferably such angle is between about 5° and 15°, and more preferably about 7°. The tabs are separated by slots 30 which are undercut into the socket portion 22, as indicated at 32, to facilitate flexure of the tabs about their juncture 29 with the socket portion 22 during coupling of the connector ends, as will be discussed subsequently.

The sealing portion 20 of the fitting 16 extends forwardly from the socket portion 22 and includes a generally cylindrical base 34. An outer surface 46 of the base is disposed radially inwardly of the inner surface 24 of the socket portion 22 to define a radially outwardly open channel 40. A rear end of the channel is closed by an annular flange 36. Preferably another flange 38 is diposed forwardly of the rear flange 36 in axially spaced relation thereto to close the front end of the channel 40. This latter flange 38 may be eliminated, if necessary, to facilitate seal installation. The preferrred channel 40 of the surface 46 is thus bordered by a front face 42 of the rear flange 36 and a rear face 44 of the front flange 38, and has a depth greater than the thickness of the socket portion 22.

The outer diameters of the flanges 36, 38 are substantially equal to that of the socket section 22, with the outer peripheral surface 48 of the rear flange 36 being essentially contiguous with the outer peripheral surface 26 of the socket portion 22.

An inner, cylindrical surface 50 of the base is preferably of the same diameter as the inner surface 52 of the associated pipe end so as to be contiguous therewith when the fitting is secured thereto, as indicated at 51 in FIG. 1.

A rear face 54 (see FIG. 4) of the rear flange 36 defines a radial shoulder against which a front end edge 56 of the pipe connector end abuts, as indicated at 53 in FIG. 2.

The channel 40 is adapted to receive a seal, preferably an O-ring seal 58 formed of a suitably flexible and resilient rubber or plastic material. This seal ring 58 can be stretched so as to be inserted over the front flange 38 of the sealing portion 20. The uncompressed outer diameter of the seal ring when positioned in the channel 40 is preferably slighter larger than the outer diameter of the sealing portion 20, i.e., the uncompressed thickness of the seal ring 58 is greater than the depth of the channel 40, to effect a fluid seal within a coupler sleeve 60, as will be discussed subsequently.

The fitting 16 can be joined to a pipe connector end 12 or 14 in any suitable fashion, such as, for example, by cementing, solvent welding, or resistance welding, although conventional spin welding techniques are preferred whereby the inner surface 24 of the socket portion 22 and the shoulder 54 of the sealing portion 20 are respectively joined to the outer surface 62 and forward edge 56 of the mating pipe end.

Preferbly, the length of the inner surface 24 of the socket portion 22 is no greater than about one-half the outer diameter of the pipe connector end.

The one-piece fitting 16 is to be affixed to a pipe end and inserted into a chamber preferably of the type provided by a separate sleeve 60 forming part of the preferred coupler assembly 10.

The coupler sleeve 60 is an open-ended, generally cylindrical member formed of any suitable material, such as a thermoplastic material. The sleeve includes inner and outer generally cylindrical surfaces 64, 66 and a radial partition wall 68 that extends slightly inwardly from the inner surface 64 at about the axial midpoint of the sleeve, to separate the interior of the sleeve into coaxial chambers 70, 72. Within each chamber there is formed, along the inner surface 64 of the sleeve, an annular recess 74 (see FIG. 2). The recess includes an inclined surface 76 and a radially extending abutment wall 78. The inclined surface 76 is inclined axially and radially outwardly relative to the longitudinal axis of the sleeve by an angle substantially equal to the angle of inclination of the locking tabs 18. The illustrated abutment walls 78 are situated axially inwardly from outer ends of the sleeve and have depths which are less than the thickness of the tabs 18.

The outer ends of the sleeve are slightly beveled outwardly at 80 to facilitate entry of the fittings, as will be explained.

The axial distance from one abutment wall 78 to the nearest face 82 of the partition wall 68 of the sleeve is substantially equal to the length of each fitting.

In operation, each pipe connector end 12, 14 is, as shown in FIG. 5, mated with a fitting 16 in any suitable manner such as by spin welding. Seal rings 58 are stretched and slipped over the front flanges 38 of the fittings and rest within the channels 40. The connector ends 12, 14 are then inserted into the chambers 70, 72 of the sleeve 60. The seal ring 58 of each fitting is contacted by the beveled edge 80 of the sleeve and is wedgingly compressed. The inclined surface 76 of the recess 74 also compresses the seal ring. Engagement with the inner surface 64 of the sleeve causes the ring seal to remain sealingly compressed. As the tabs 28 engage the beveled edge 80, they are resiliently bent or flexed inwardly about their juncture with the socket portion 22. This bending action is facilitated by the undercut portions 32 of the slots 30. When the best tabs underlie the recess 74, the tabs spring outwardly. Removal of the connector ends 12, 14 is thereby prevented by engagement between the edges of the tabs and the abutment walls 78 of the recess.

It will be realized that the pipe ends are thus nestingly and securely held within the chambers 70, 72. While axial removal of the pipe ends from the socket is prevented, the pipes together with their fittings 16 are able to be rotated within the socket after connection has been made. Overtravel of the pipes within the chamber during installation is prevented by the partition wall 68 which limits travel of the pipe ends.

The connector ends are thus able to be conveniently secured against release, while assuring the presence of a tight fluid seal. The coupling can be economically manufactured and installed since both the sealing and locking components are on a common element.

It will be realized that a fitting according to the present invention is adapted for use in any socket environment. For instance, a fitting may be installed onto one of the pipe ends, with the other pipe end including a chamber similar to the chamber of the afore-described sleeve. Connection between the pipe ends is thereby effected directly by telescoping insertion of the fitting within the other pipe end.

It should also be noted that the term "pipe" as used herein is intended to cover all types of flow conductors such as straight pipes, pipe elbows, tees, etc. formed of any material. For example, the coupler assembly could be employed to connect the end of a straight pipe with the end of a 45° elbow or T-shaped adapter.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A coupling assembly for a pipe end, said assembly being of the type comprising a fitting securable to the pipe end and securable within the chamber of a coupler, the improvement wherein:
   said coupler comprises:
      a generally cylindrical internal surface portion;
      an internal generally frustoconical surface portion extending outwardly of said cylindrical surface portion at an acute angle relative to the longitudinal axis of said coupler, said frustoconical surface portion forming a recess which terminates short of an outer end of said coupler, and
      an abutment wall extending inwardly from the terminal end of said frustoconical surface portion to form the terminal end of said recess;
   said fitting comprising:
      a generally cylindrical socket portion for receiving the pipe end;
      a pair of axially spaced flanges disposed forwardly of said socket portion and forming a radially outwardly open channel adapted to receive a resilient seal ring extending, when uncompressed, radially beyond the outer diameter of said socket portion for engagement with the generally cylindrical surface portion of said coupler;
         the outer diameter of the rearwardmost one of said flanges being substantially the same as the outer diameter of said socket portion, with said channel extending radially inwardly beyond an inner diameter of said socket portion;
         a rear surface of the rearwardmost one of said flanges forming a shoulder extending radially inwardly relative to the inner surface of said socket portion for limiting insertion of the fitting onto the pipe end; and
      a plurality of circumferentially spaced tabs extending rearwardly and outwardly from said socket portion at an acute angle relative to the longitudinal axis of said fitting from its junction with said socket portion to an outer edge thereof corresponding substantially to the length of said recess of said coupler so that when said fitting is inserted into said coupler said tabs are initially flexed inwardly and then spring outwardly into said recess such that outer terminal edges of said tabs are disposed internally of said coupler and are engageable with said abutment wall of said coupler to prevent withdrawal of said fitting;
   said socket portion, tabs, and flanges being of integral, one-piece construction formed of thermoplastic material.

2. A fitting according to claim 1 wherein said tabs project at an angle of between 5° and 15° relative to the longitudinal axis of the fitting.

3. A fitting according to claim 2 wherein said angle is 7°.

4. A fitting according to claim 1 wherein said tabs are separated by slots which are undercut into said socket portion beyond the juncture of said tabs projecting therefrom.

5. A coupling assembly according to claim 1 wherein said abutment wall extends radially.

6. A coupling assembly according to claim 1 wherein the outer edge of said coupler is beveled to facilitate compression of the seal.

7. A coupling assembly for a pair of pipe ends, said assembly being of the type comprising a pair of fittings securable to the pipe ends and securable with opposite chambers of a coupler, the improvement wherein:
   said coupler comprises an open ended sleeve forming a pair of chambers at opposite ends of the sleeve, each chamber including:
      a generally cylindrical internal surface portion;
      an internal generally frustoconical surface portion extending outwardly of said cylindrical surface portion at an acute angle relative to the longitudinal axis of said coupler, said frustoconical surface portion forming a recess which terminates short of an outer end of said coupler, and
      an abutment wall extending inwardly from the terminal end of said frustoconical surface portion to form the terminal end of said recess;
   each of said fittings comprising:
      a generally cylindrical socket portion for receiving an associated pipe end;
      a pair of axially spaced flanges disposed forwardly of said socket portion and forming a radially outwardly open channel adapted to receive a resilient seal ring extending, when uncompressed, radially beyond the outer diameter of said socket portion for engagement with the generally cylindrical surface portion of said sleeve;
         the outer diameter of the rearwardmost one of said flanges being substantially the same as the outer diameter of said socket portion, with said channel extending radially inwardly beyond an inner diameter of said socket portion;
         a rear surface of the rearwardmost one of said flanges forming a shoulder extending radially inwardly relative to the inner surface of said socket portion for limiting insertion of the fitting onto the pipe end; and
      a plurality of circumferentially spaced tabs extending rearwardly and outwardly from said socket portion at an acute angle relative to the longitudinal axis of said fitting from its junction with said socket portion to an outer edge thereof corresponding substantially to the length of said recess of said sleeve so that when said fitting is inserted into said sleeve said tabs are initially flexed inwardly and then spring outwardly into said recess such that outer terminal edges of said tabs are disposed internally of said sleeve and are engageable with said abutment wall of said sleeve to prevent withdrawal of said fitting;
   said socket portion, tabs, and flanges being of an integral, one-piece construction formed of thermoplastic material.

8. A coupling assembly according to claim 7 wherein the outer edges of said sleeve are beveled to compress the seal rings and tabs inwardly as said fittings travel into the sleeve.

9. A coupling assembly according to claim 7 wherein said sleeve includes partition wall means disposed intermediate the ends of said sleeve and extending a short distance inwardly from said inner surface of said sleeve to limit inward travel of said fittings.

* * * * *